United States Patent [19]

Quataert

[11] Patent Number: 4,566,258
[45] Date of Patent: Jan. 28, 1986

[54] DEVICE FOR WORKING CROP LYING ON THE GROUND

[75] Inventor: Petrus M. Quataert, Nuenen, Netherlands

[73] Assignee: P. J. Zweegers en Zonen Landbouwmachine Fabriek B.V., Geldrop, Netherlands

[21] Appl. No.: 505,736

[22] Filed: Jun. 20, 1983

[30] Foreign Application Priority Data

Jul. 9, 1982 [NL] Netherlands .................. 8202785

[51] Int. Cl.⁴ ............................................. A01D 78/10
[52] U.S. Cl. ........................................ 56/370; 56/377; 56/400
[58] Field of Search ............... 56/365, 366, 367, 370, 56/377, 400, 400.21

[56] References Cited

U.S. PATENT DOCUMENTS

| | | | |
|---|---|---|---|
| 3,910,019 | 10/1975 | Schlittler | 56/370 |
| 4,026,093 | 5/1977 | Knusting et al. | 56/370 |
| 4,056,923 | 11/1977 | Zweegers | 56/370 |
| 4,166,352 | 9/1979 | Knusting | 56/370 |
| 4,245,457 | 1/1981 | Gerlinger | 56/370 |

FOREIGN PATENT DOCUMENTS

| | | | |
|---|---|---|---|
| 2432827 | 1/1976 | Fed. Rep. of Germany | 56/370 |
| 2844235 | 4/1980 | Fed. Rep. of Germany | 56/370 |
| 2919241 | 11/1980 | Fed. Rep. of Germany | 56/370 |
| 7606199 | 12/1977 | Netherlands | 56/370 |

Primary Examiner—Gene Mancene
Assistant Examiner—David I. Tarnoff
Attorney, Agent, or Firm—Edmund M. Jaskiewicz

[57] ABSTRACT

A rake for working crop lying on the ground having a pair of rotary rake wheels rotatably driven by gear boxes mounted at the ends of the frame beam. The first rake wheel is fixed to the frame beam, while the second rake wheel is mounted on a pivotable arm. The second rake wheel is so designed that it can be attached in two working positions. In the first position the rake wheels are transversely aligned to the direction of travel and driven in opposite directions so that the crop is direct between them. In the other position the rake wheels are located obliquely one behind the other and driven in the same direction so as to direct the crop to one side of the rake.

11 Claims, 7 Drawing Figures

DEVICE FOR WORKING CROP LYING ON THE GROUND

The invention relates to a device for working crop lying on the ground comprising a frame and two tined rake members which are rotatable about upwardly inclined rotary axes and can be driven through gear boxes connected with a frame beam, at least one of said gear boxes being arranged near one end of the frame beam so as to be pivotable about an at least substantially vertical pivotal axis with respect to the frame, whilst means are provided to invert the direction of rotation of at least one of the driven rake members in a manner such that the device can be changed over between a first working position in which the two rake members are located one behind the other, viewed in a direction transverse of the intended direction of movement during operation, and can be driven so that on the proximal sides of the rake members the tines move to the rear, viewed with respect to the direction of movement, and a second working position in which, viewed in the direction of movement, the rake members are located obliquely one behind the other and can be driven in the same direction.

Such a device is known from Dutch Patent Application No. 7512195. In this known device the two gear boxes are arranged at the ends of the frame beam so as to be pivotable about pivotal axes and connected with the aid of coupling rods with a drawbar, which is also pivotable with respect to the frame beam. For changing over the device from one working position into the other the frame beam is turned with respect to the drawbar, whilst also the gear boxes are turned with respect to the frame beam with the aid of the coupling rods. In itself this device operates satisfactorily, but it may be a disadvantage that the device comprises a large number of relatively pivotable parts so that the structure of the device is complicated.

The invention has for its object to provide a device of the kind set forth which has a simpler structure.

According to the invention this can be achieved in that with the end of the frame beam inclined to the direction of movement in normal operation, which end is remote from the gear box rigidly secured to said frame beam, is adjustably coupled one end of an arm with the aid of an at least substantially vertical pivotal shaft, whereas the end of the arm remote from the pivotal shaft has pivotally coupled with it the other gear box with the aid of the first-mentioned, at least substantially vertical pivotal shaft with which one end of a coupling rod is coupled, which coupling rod can be coupled by its other end in different positions with the frame beam in order to simultaneously lock the arm and the gear box concerned against rotation about the pivotal shafts in the two working positions.

By using the construction embodying the invention a device of simple structure can be obtained, in which only the arm and the gear box coupled with the free end of the arm need be turned about an at least substantially vertical pivotal shaft for changing over the device from one working position to the other.

According to a further aspect of the invention the arm and the gear box carried by said arm can be locked with the aid of the coupling rod in at least two positions in which, viewed in a direction transverse of the intended direction of movement, the rake wheels are located at least substantially one behind the other and at different distances from one another. By this measure the device can be used also in the working position in which the two rake wheels displace the crop in directions towards one another with different distances between the rotary axes of the rake members so that in this working position the device can operate with different working widths and provide different widths of the swaths to be formed.

The invention will be described more fully hereinafter with reference to an embodiment of a device according to the invention shown schematically in the accompanying Figures.

Figure 1:
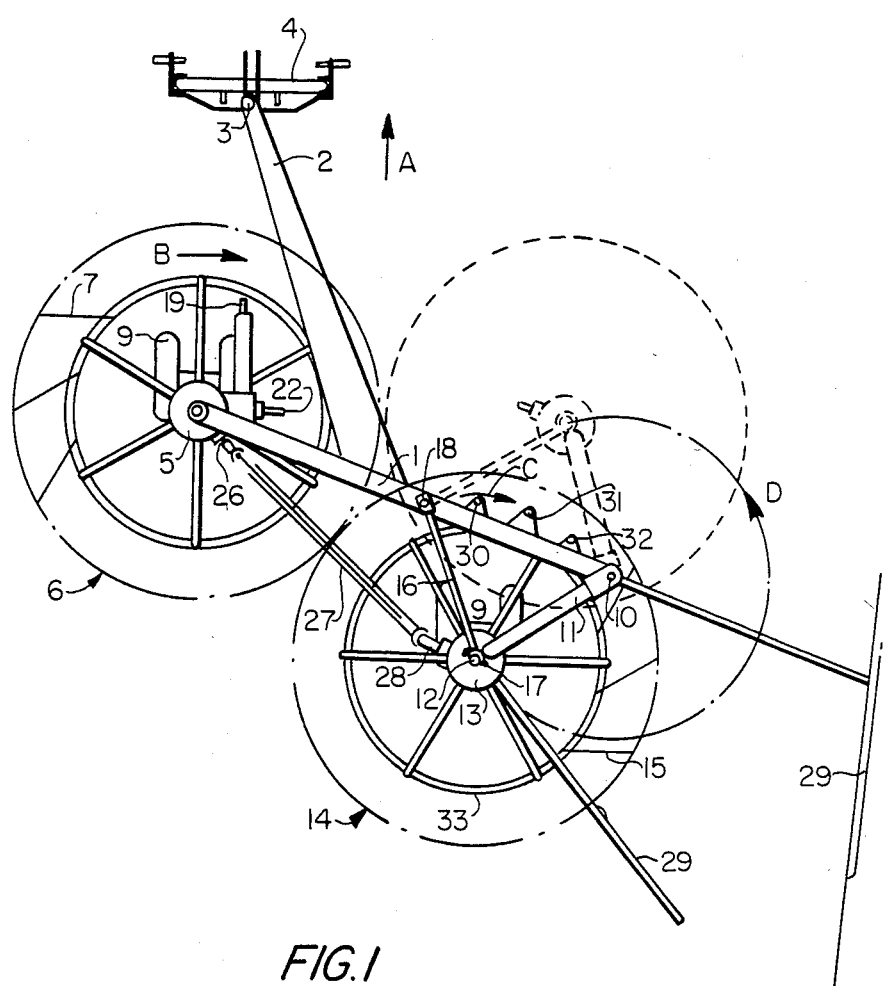
FIG. 1 is a plan view of the device embodying the invention in a first working position.
Figure 2:
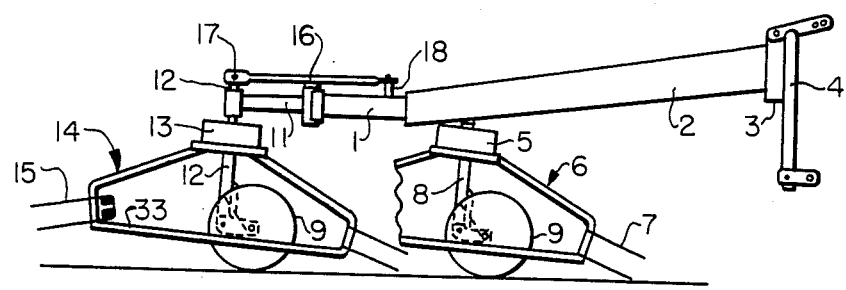
FIG. 2 is a side elevation of the device of FIG. 1.
Figure 6:
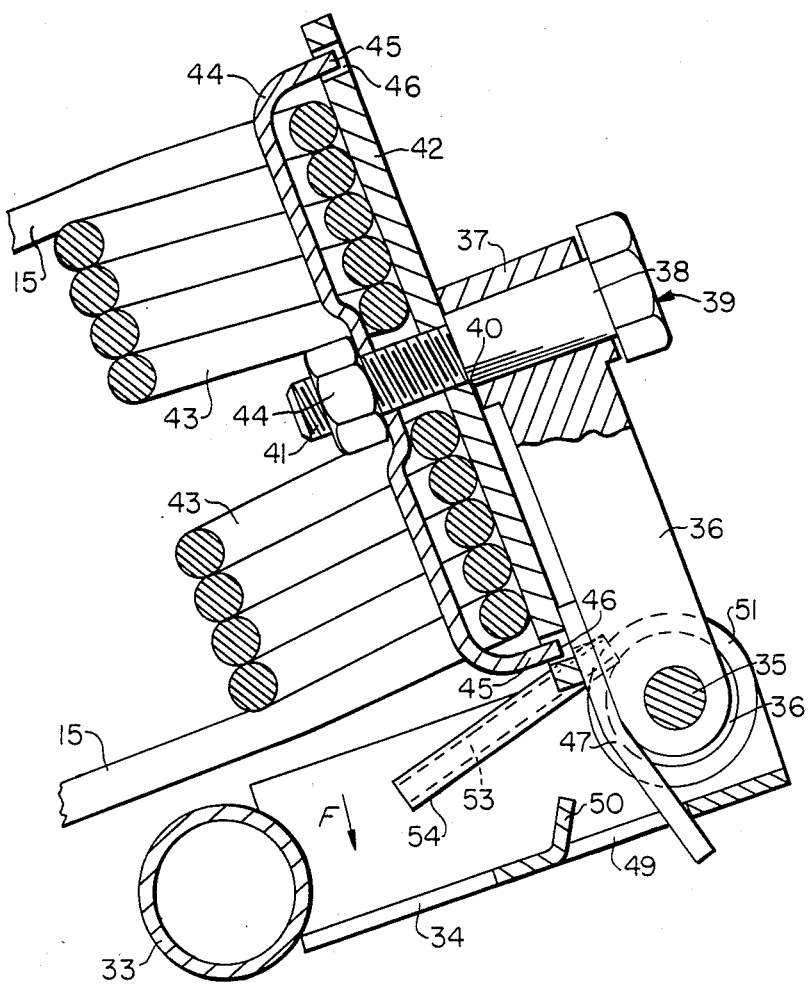
FIG. 6 is a sectional view of an embodiment of a tine connection with a rake member.
Figure 7:
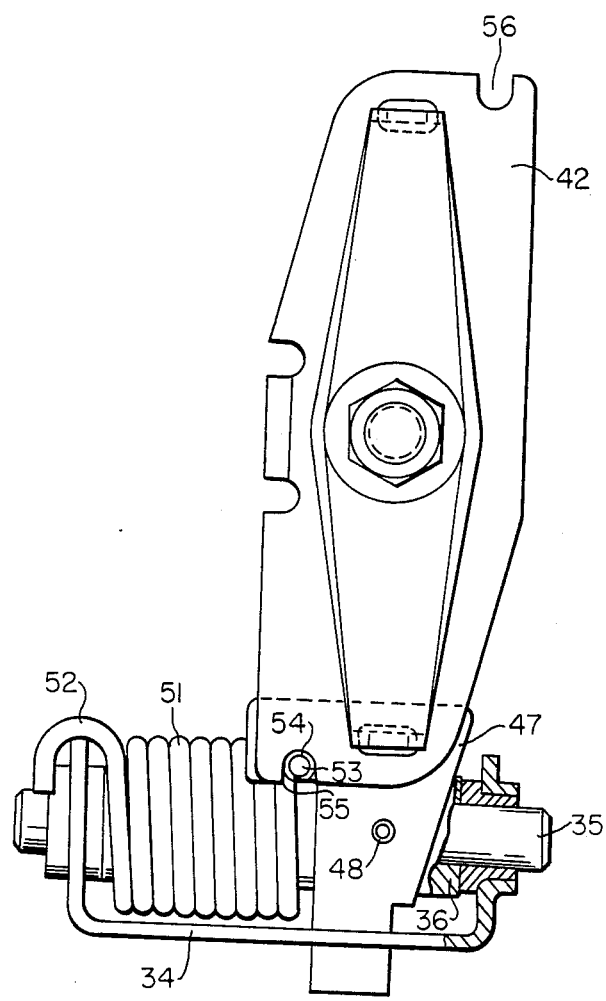

FIG. 7 is an elevational view in the direction of the arrow VII in FIG. 6, some parts of FIG. 6 being omitted for the sake of clarity The device shown in FIG. 1 comprises a frame beam 1 which is inclined in operation to the intended direction of movement in the direction of the arrow A. Between the ends of the frame beam 1 a drawbar 2 is rigidly secured to said frame beam 1 in a position inclined to the direction of movement indicated by the arrow A. The front end of the drawbar 2 has pivoted to it a coupling member 4 of known type with the aid of a vertical pivot shaft 3. With the aid of said coupling member 4 the device can be attached to the three-point lifting device of a tractor. To one end of the frame beam 1 is rigidly fastened a gear box 5. Below the gear box 5 is arranged a rake member 6, which is provided with tines 7 evenly distributed along the circumference of the rake member and extending outwardly away from the outer circumference of the rake member. To the gear box is furthermore fastened a downardly extending arm 8, which is provided with two ground wheels 9 located below the rake member 6 and supporting the device.

The end remote from the gear box 5 has pivotally coupled with it one end of an arm 11 with the aid of a pivotal shaft 10, which is at least substantially vertical in normal operation. A gear box 13 is pivotally coupled with the end of the arm 11 remote from the pivotal shaft 10 with the aid of a pivotal shaft 12 extending parallel to said pivotal shaft 10. Through a gear wheel transmission located in said gear box 13 can be driven a rake member 14 located below the gear box 13 and being provided like the rake member 6 with resilient tines 15. As usual the disposition of the rotary shafts of the rake members 6 and 17 is such that during the use of the device said rotary axes extend in planes at least substantially parallel to the intended direction of movement indicated by the arrow A in a manner such that free ends of the tines 7 and 15 will move in forwardly inclined planes.

Below the rake member 14 are also arranged ground wheels 9 supporting the frame with the aid of a bent-over end 12' of the shaft 12.

FIG. 1 furthermore shows that the arm 11 is blocked against a turn about the pivotal shaft 10 with the aid of a coupling rod 16. One end of said coupling rod 16 is pivotally coupled with the end of the shaft 12 projecting above the arm 11 with the aid of a pivotal pin 17 extending at right angles to the shaft 12. The end of the coupling rod 16 remote from the shaft 12 has a hole receiving the top end of a pin 18 secured to the frame beam 1. It will be obvious that in this way with the aid of the coupling rod 16 simultaneously the arm 11 is guarded against a turn about the pivotal shaft 10 and the gear box 13 is guarded against a turn about the pivotal shaft 12. The structure is such that the longitudinal axis of the coupling rod 16 is at an angle of 45° to the centre line of the pin 17.

Figures 4, 5:
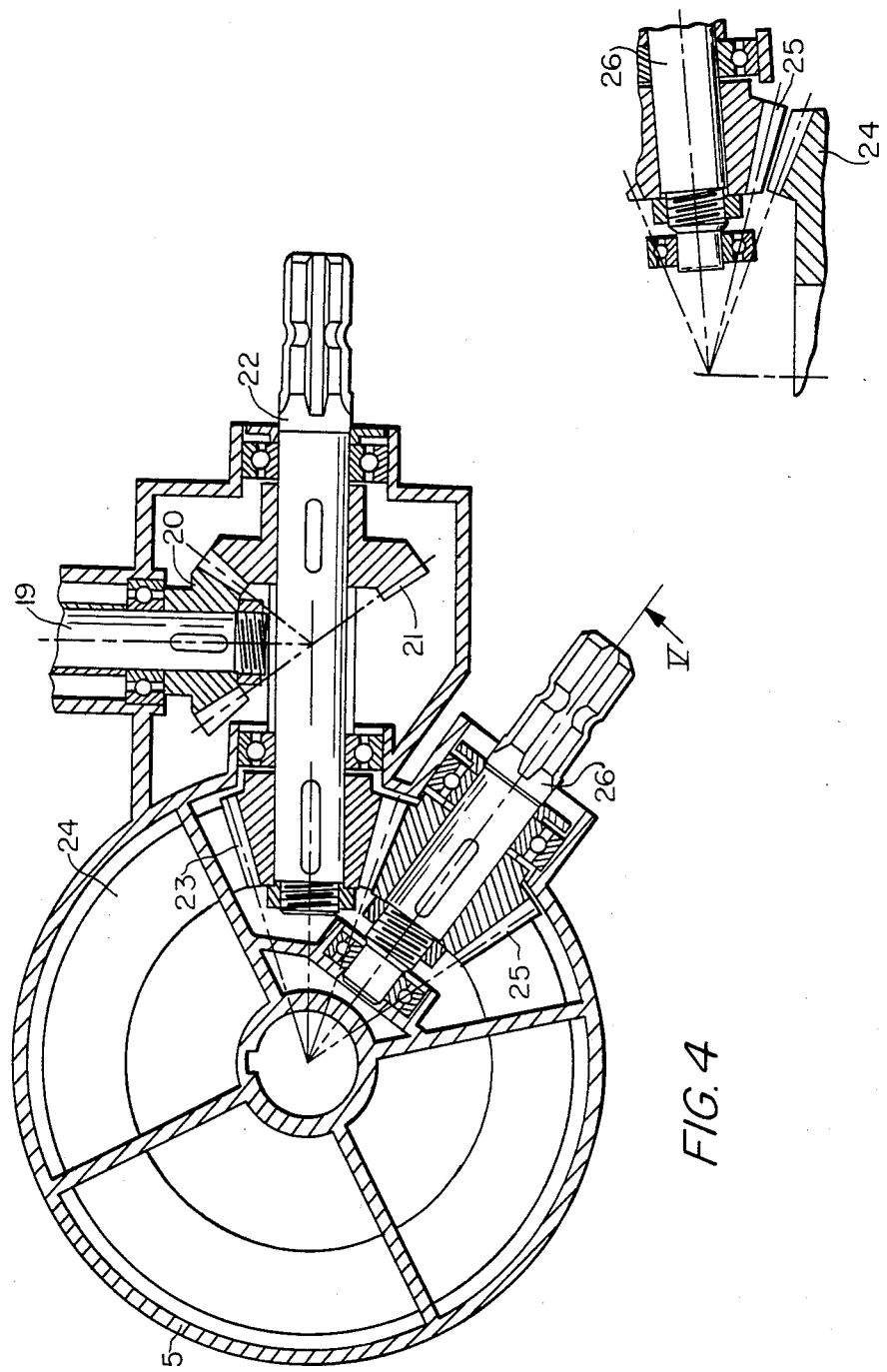
FIG. 4 is a sectional view of a gear box used in the device embodying the invention.
FIG. 5 is part of a sectional view taken on the line V—V in FIG. 4.

FIG. 4 shows in particular that the gear box 5 accommodates a shaft 19, whose front end (FIG. 1) projecting out of the gear box 5 can be linked by using an auxiliary shaft to the power take-off shaft of a tractor or the like. The end of the shaft 19 located inside the gear box 5 is provided with a bevel gear wheel 20, which is in mesh with a bevel gear wheel 21 fastened to a shaft 22 journalled in the gear box 5 and crossing the shaft 19 at right angles. One end of the shaft 22 protrudes from the gear box 5, whereas the other end of the shaft 22 is provided with a bevel gear wheel 23, the teeth of which are in mesh with the teeth of a bevel gear wheel 24 journalled in the gear box 5 and being rigidly secured to the rake member 6 arranged below the gear box 5.

The teeth of the bevel gear wheel 23, as will be seen from FIG. 4, are furthermore in mesh with the teeth of a bevel gear wheel 25 fastened to a shaft 26 also journalled in the gear box 5 and also having its end protruding from the gear box 5. The shaft 26 with the bevel gear wheel 23 supported by the shaft 25, as will be seen in particular from FIG. 5, is disposed so that the bevel gear 25 is capable of turning free of the gear wheel 24. In the working position of the device shown in FIG. 1 the end of the shaft 26 emerging from the gear box 5 is coupled with the aid of a telescopic auxiliary shaft 27 with an end of a shaft 28 protruding from the gear box 13 in which said shaft is journalled. The end of the shaft 28 located inside the gear box 13 is provided with a bevel gear wheel similar to bevel gear wheel 25 the teeth of which are in mesh with the teeth of a gear wheel corresponding with bevel gear wheel 24 and being rigidly secured to the rake member 14.

The structure is such that when during operation the device is moved in the direction of the arrow A and the rake members 6 and 14 are driven, the rake members will rotate in clockwise direction, that is to say, in the directions indicated by arrows B and C respectively. It will be obvious that, viewed in the direction of movement the leading rake member 6 will displace crop lying on the ground to the right in front of the rake wheel 14, whereas the rake member 14 located obliquely behind the rake member 6, viewed in the direction of movement, will displace all crop getting into reach of said rake member 14 also to the right, as viewed in FIG. 1. As is schematically shown in FIG. 1, the device may be provided with adjustable guide members of swath boards 29, with the aid of which the displaced crop can be deposited in the desired manner in a swath.

Figure 3:
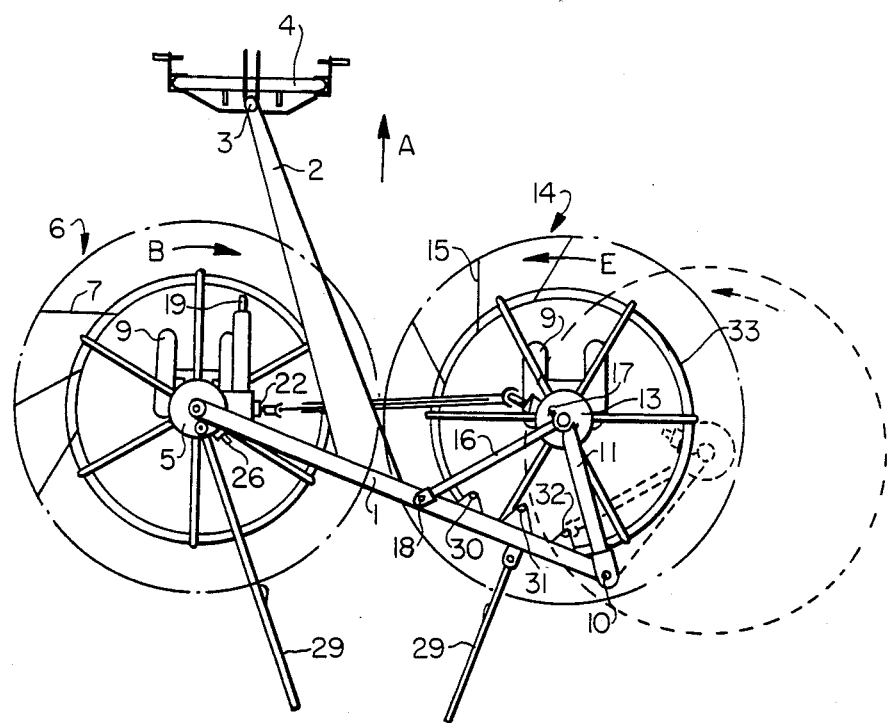
FIG. 3 is a plan view of the device embodying the invention in a second working position.

After loosening the coupling rod 16 from the pin 18 fastened to the frame beam 1 the arm 11 with the rake member 14 supported by said arm can be turned in the direction of the arrow D from the position shown in FIG. 1 into the position indicated by broken lines in FIG. 1 and by solid lines in FIG. 3. For this turn the auxiliary shaft 27 is discoupled from the end of the shaft 26 emerging from the gear box 5 and after the turn it is coupled with the end of the shaft 22 protruding from the gear box 5. In order to guard the arm 11 against a turn about the pivotal shaft 10 and the gear box 13 against a turn about the pivotal shaft 12, it is only necessary to slip the free end of the coupling rod 16 onto the pin 18, which can be simply performed by turning the coupling rod 16 from the position shown in FIG. 1 through 180° about the pin 17. The disposition is such that, as will be apparent from FIG. 3, the paths of the two rake members 6 and 14 described by the ends of the tines 7 and 15 respectively are at least substantially tangential to one another. By changing over the auxiliary shaft 27 the rake wheel 14 will be driven in operation in the direction of the arrow E opposite the direction of rotation of the rake wheel in the working position shown in FIG. 1. The positions of the frame beam 1 and of the drawbar 2 rigidly secured thereto have at least substantially not changed with respect to the intended direction of movement indicated by the arrow A and the longitudinal axis of the frame beam 1 is then at an angle of about 70° to the intended direction of movement.

In both working positions, viewed in the direction of movement, the rotary axis of the adjustable rake wheel is nearer the rotary axis of the other rake wheel than the end of the frame beam 1, about which the adjustable rake wheel can turn, whilst in both working positions the longitudinal axis of the frame arm 11 is at an angle of about 50° to the longitudinal axis of the frame beam 1.

It will be obvious that in the working position shown in FIG. 3 the two rake members displace the crop during operation towards one another and move the crop between them to the rear to deliver the crop to the rear. If desired, as is schematically shown in FIG. 3, the device may be provided with swath boards 29 which deposit the crop in a swath of the desired width.

As is furthermore shown in FIGS. 1 and 3 the frame beam 1 is provided, apart from the upwardly extending pin 18, with further upwardly extending pins 30 to 32 so that the pins 30 to 32 are spaced apart by different distances from the longitudinal axis of the frame beam 1. The end of the coupling rod 16 can be optionally coupled with one of said pins 30 to 32 as is schematically shown in broken lines for the arm 11 and the rake member 14 in a position in which the end of the coupling rod 16 is connected with the pin 32 (FIG. 3). The position of the pins 30 to 32 is chosen so that, when the end of the coupling rod 16 is slipped onto a pin for blocking the arm 11 against a turn about the pivotal shaft 10 and the gear box 13 against a turn about the pivotal shaft 12, the rotary axis of the rake member 14 supported by the gear box 12 is invariably located in a plane extending parallel to the direction of movement indicated by the arrow A, whilst the ends of the tines will move in a forwardly inclined plane.

It will be obvious that in the position in which the relatively co-operating rake members 9 and 14 are located at least substantially one behind the other, viewed transversely of the intended direction of movement indicated by the arrow A and move the crop between them to the rear the distance between said rake members can be varied in a simple manner. In this way the device can have a large working width to form a comparatively broad swath, which is particularly suitable for further processing with the aid of devices forming so-called wound bales or for being picked up by loading wagons.

The resilient tines 15 are preferably fastened to the adjustable rake member 14 with the aid of the construction shown in FIGS. 6 and 7.

FIG. 6 shows that for supporting the resilient tines 15 the continuous rim 33 of the rake member 14 has fastened to it at equal intervals U-section supports 34 extending radially inwards from the rim 33. In the limbs of said supports are journalled pins 35 crossing the rotary axis of the rake wheel at right angles. About each pin 35 a sleeve 36 is adapted to turn. The top end of the carrier is provided with a hub 37 in which a part 38 of a bolt 39 crossing the pin 35 at right angles is located. The length of said part 38 is slightly larger than the length of the hub 37 so that a shoulder 40 formed at the transitional area between the part 38 and the thinner screw-threaded part 41 of the bolt is located outside the hub 37. On the shoulder 40 is bearing a plate 42 screwed onto the screw-threaded part 41 of the bolt 39. To the plate 42 are fastened the turns 43 of the tines 15 with the aid of a locking plate 44, which is also screwed onto the screw-threaded part 41 of the bolt and is retained thereon by a nut 44' screwed onto the bolt. Bent-over ends 45 of the locking plate are located in recesses provided for this purpose in the plate 42.

From the Figures it is furthermore apparent that the lower end of the supporting plate 42 is bearing on a plate 47, which is fixed with the aid of a pin 48 to the support 36. One lower end of the plate 47 is located in a recess 49 in the web between the two limbs of the bracket 34, said recess being bounded at its end facing the rim 33 by an upwardly bent-over tag 50.

The sleeve 36 is surrounded over part of its circumference by a helical spring 51, one end 52 of which is hooked around a limb of the U-section support 34 in order to prevent the helical spring 51 from turning about the pin 35. The other end 53 of the helical spring is approximately radial to the outer circumference of the sleeve 36 arranged around the pin 35, which end 53 is surrounded by an envelope 54. The envelope 54 extends in a recess provided in the plate 47 and being open on the underside and in a recess 55, which is also open on the underside and is provided in a lower end of the plate 42 being in contact with the top end of the plate 47. It will be obvious that in this way the plate 42 is guarded against a turn about the bolt 39 by the part of the end 53 of the spring extending through the recess 55 and surrounded by the envelope 54.

It should be noted that the FIGS. 6 and 7 show the tine-supporting parts in the working position in which under the action of centrifugal force exerted on the tines and the parts supporting said tines the tines have turned, as viewed in FIG. 6, in anti-clockwise direction about the shaft 35 into the position in which a further turn is prevented by the plate 47, the lower end of which has come into contact with a boundary rim of the recess 49 serving as a stop. From FIG. 6 it is apparent that the disposition is such that the tines 15 remain free of the rim 33 so that undesirable wear of the tines due to contact between the tines 15 and the rim 33 will not occur. In a standstill of the rake member the tines have turned under the action of the force of the helical spring 51, as viewed in FIG. 6, out of the position shown in FIG. 6 in clockwise direction about the pin 35 into a position in which the lower end of the plate 47 is in contact with the upwardly bent-over tag 50 serving as a stop.

In this position the end of the helical spring surrounded by the envelope 54 is readily accessible and the tension of the helical spring is not too high so that a downward turn of this end of the spring can be readily prevented by manual force.

By turning said end downwards by exerting a force downwards in the direction of the arrow F, the end of the spring located in the recess 55 and surrounded by the envelope 54 can be removed from the recess 55, after which the plate 42 with the tines secured thereto can be turned through 180° about the centre line of the bolt 39. When subsequently the end 53 of the spring surrounded by the envelope 54 is released, this end will snap into a recess 56 corresponding with the recess 55 and provided in the end of the supporting plate 42 opposite the recess 55 so that the supporting plate 42 with the tines 7 supported thereby is again guarded against a turn about the bolt 39.

The above-described, simple change-over of the tines permits in both working positions of the device of invariably disposing the tines so that they are rearwardly inclined from their fastening areas on the rake member, viewed in the direction of rotation, as will be apparent from FIGS. 1 and 3.

I claim:

1. A device for working corp lying on the ground having a frame comprising a frame beam extending transverse to the intended direction of travel, and a draw bar fixed to said frame beam and extending forwardly from said frame beam, a first gear box fixed to one end of said frame beam, an arm having one end pivotally coupled with the other end of said frame beam so as to be adjustable with respect to said frame beam about a substantially vertical pivot axis, a second gear box being pivotally mounted to the free end of said arm so as to be adjustable about a substantially vertical pivot axis with respect to said arm, a coupling rod coupled with said second gear box for fixing the arm and said second gear box in various positions on either side of said frame beam, a pair of tined rake wheels rotatable about upwardly extending rotary shafts and each drivable respectively via said gear boxes, means for reversing the direction of rotation of one of said driven rake wheels, the device being such that in a first position of said arm the rake wheel at the free end of the arm is disposed in front of the frame beam and said rake wheel can be driven in such a direction that viewed in the direction of movement the tines on the proximal sides of the rake wheels move to the rear, and in a second position of said arm viewed in the intended direction of travel the rake wheels are located obliquely one behind the other and can be driven in the same direction and the rake wheel on the free end of the arm is disposed behind the frame beam, the first gear box is provided with an input shaft to be coupled with the aid of an auxiliary shaft with the power take-off shaft of a tractor, said input shaft being coupled through a gear wheel transmission with a first output shaft, which protrudes out of the first gear box and which is provided at the other end with a first bevel gear wheel which is in mesh with a second bevel gear wheel located below the first bevel gear wheel and fastened to the respective rake wheel and with a neighbouring bevel gear wheel fastened to a second output shaft protruding out of the gear box and being arranged above the second gear wheel secured to the rake wheel in a manner such that it rotates free of the second gear wheel one of the ends of the output shafts emerging from the first gear box can be coupled selectively with the aid of an auxiliary shaft with one end of a shaft journalled in the second gear box secured to the first end of the arm.

2. A device as claimed in claim 1 wherein the arm and said second gear box can be locked with the aid of the coupling rod in at least two positions in which, viewed in a direction transverse of the intended direction of movement, the rake wheels are located at least substantially one behind the other and at different distances from one another.

3. A device as claimed in claim 1 wherein the coupling rod is coupled with the aid of a horizontal pivotal pin to an end of the pivotal shaft of said rake where projecting above the arm.

4. A device as claimed in claim 3 wherein said pivotal shaft is at an angle of about 45° to the longitudinal axis of the coupling rod.

5. A device as claimed in claim 1 wherein the end of the frame beam remote from the first gear box fixed to said frame beam is located at a larger distance from the first gear box than is the second gear box of the adjustable rake member in either of the two working positions.

6. A device as claimed in claim 1 wherein in the various working positions the longitudinal axis of the frame beam is at an angle of about 70° to the intended direction of movement during normal operation.

7. A device as claimed in claim 1 wherein in two working positions the arm is at an angle of at least substantially 50° to the longitudinal axis of the frame beam.

8. A device as claimed in claim 1 wherein the tines of the adjustable rake wheel are adjustable between two working positions by turning them through 180° about an axis of rotation intersecting the axis of rotation of the rake wheel at least substantially at right angles.

9. A device as claimed in claim 8 in which the tines are fastened to carriers which are rotatable under the action of centrifugal force about pivotable shafts against the action of helical springs surrounding the pivotal shafts, said tines are supported by supports adapted to turn about the pivotal shafts with respect to the carriers, said supports having recesses for receiving ends of the helical springs extending substantially radially with respect to the pivotal shafts.

10. A device as claimed in claim 9 wherein the carriers supporting the tines co-operate with stops rigidly secured to the rake wheel for limiting the pivotal movements of the carriers.

11. A device in claim 10 wherein the carriers are provided with a protruding part extending through support fastened to the rake wheel by the pivotal shaft.

* * * * *